M. G. CAMPAU.
CREAM TESTER.
APPLICATION FILED JAN. 18, 1911.

1,002,366.

Patented Sept. 5, 1911.

Witnesses
O. B. Baenziger
J. G. Howlett

Inventor
Merle G. Campau
by E. S. Wheeler
Attorney.

UNITED STATES PATENT OFFICE.

MERLE G. CAMPAU, OF OCONTO, NEBRASKA.

CREAM-TESTER.

1,002,366. Specification of Letters Patent. Patented Sept. 5, 1911.

Application filed January 18, 1911. Serial No. 603,282.

*To all whom it may concern:*

Be it known that I, MERLE G. CAMPAU, a citizen of the United States, residing at Oconto, in the county of Custer, State of Nebraska, have invented certain new and useful Improvements in Cream-Testers; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a cream tester for cream separating machines, and consists in the construction and arrangement of parts hereinafter more fully set forth and claimed.

The object of the invention is to provide a simple and efficient device for use in connection with a cream separator, whereby the cream may be readily tested for the purpose of ascertaining the amount of butter fat which it contains, enabling the farmer to learn the value of his cream before offering it for sale.

The above object is attained by the device illustrated in the accompanying drawings, in which:—

Figure 2:
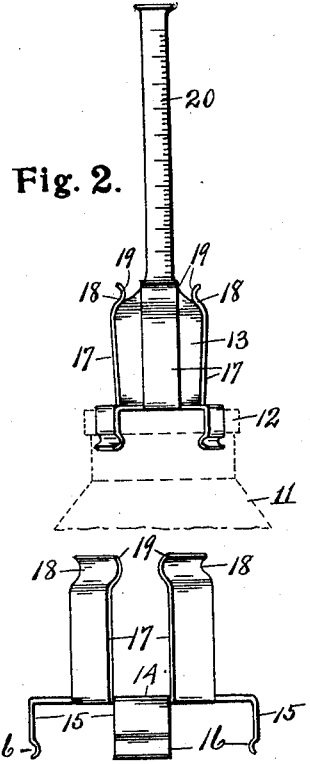
Figure 1:
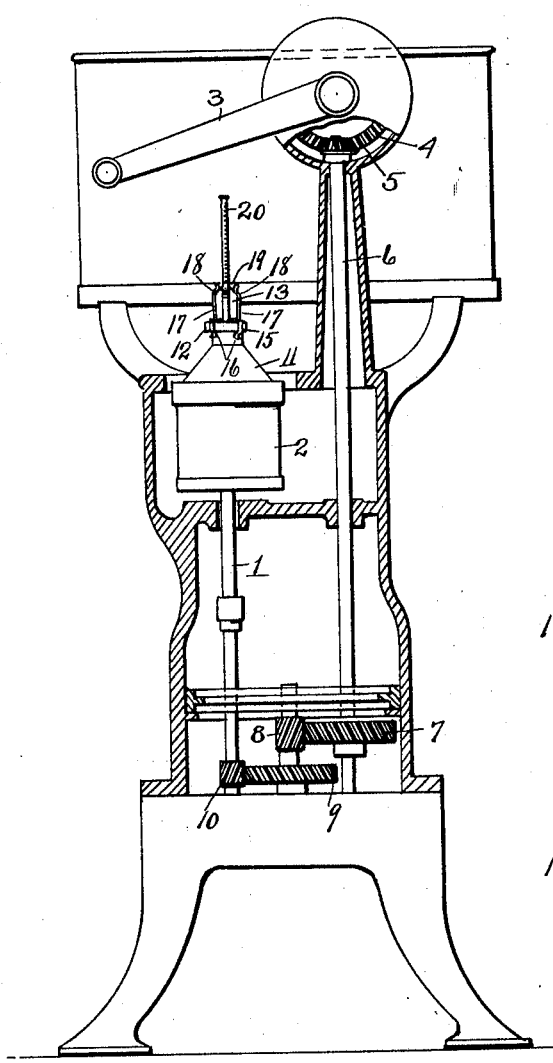
Figure 3:
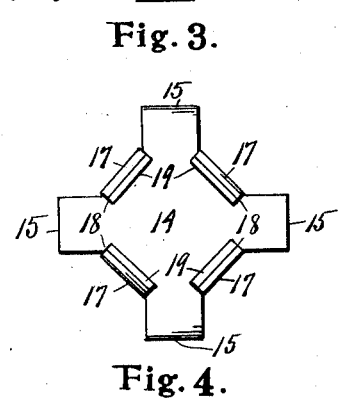
Figure 4:
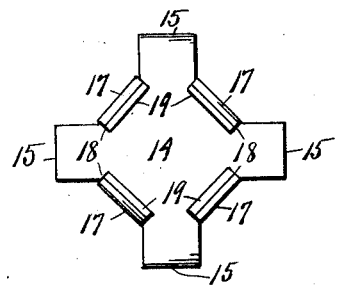

Figure 1 is a view partly in section, showing the application of my invention to the bowl of a cream separator. Fig. 2 is an enlarged view of the bottle-holder with the bottle therein, illustrating by dotted lines the application of the holder to the top of the separator bowl. Fig. 3 is an enlarged elevation of the bottle-holder, and Fig. 4 is a plan view thereof.

Referring to the characters of reference, 1 designates the bowl spindle of a cream separator carrying at its upper end the bowl 2 adapted to revolve therewith. The bowl spindle 1 is revolved through the medium of the crank 3, the gear 4 turned thereby, the pinion 5 meshing with said gear and carried on the upper end of a vertical shaft 6, said shaft at its lower end being connected through the medium of the gears and pinions 7, 8, 9 and 10 with the bowl spindle, an arrangement common in cream separating machines.

The separator bowl 2 may be of any suitable shape and is provided with a removable top or cover 11 which is conical in form and which is provided at its reduced upper end with an annular flange 12.

The bottle-holder 14 in which the testing bottle 13 is held, is made preferably of comparatively thin spring metal which is first cut into a suitable blank from which are formed the downwardly extending relatively short spring jaws 15 of which there are four disposed to describe a quadrangular figure and having at their lower ends an inwardly projecting bead 16. There is sufficient space between the spring jaws 15 to enable them to be slipped over the flange 12 of the cap of the separator bowl in a manner to secure the holder thereto and cause it to become positioned concentric with the axis of said bowl. Also formed from said metal blank are the vertically extending spring fingers 17 which are disposed between the spring jaws 15 and arranged to describe a quadrangular figure. Each of the spring fingers 17 is provided near its upper end with an inwardly bent portion 18, the terminal of which rounds outwardly, as at 19. The fingers 17 are of such length and are so disposed as to embrace and confine the body of the cream bottle while the inwardly bent portions 18 thereof extend onto the shoulder of the bottle to securely but yieldingly retain the bottle in the holder; the arrangement of said fingers being such as to position the bottle centrally of the bowl when placed therein. The outwardly rounded terminals of the spring fingers enable the bottle to be seated in the holder by entering the bottom thereof between the outwardly rounded ends of said fingers and pressing the bottle downwardly.

The testing bottle may be removed from the holder by an outward or an upward pull thereon which causes the inwardly bent portions of the spring fingers to slip from the shoulder of the bottle, thereby freeing it from the gripping action of said fingers, when its removal may be easily accomplished. The neck 20 of the bottle 13 is graduated, or provided with the usual scale to enable the quantity of butter fat contained in the cream to be determined as said fat is caused to rise therein during the operation of testing.

In order to determine the amount of butter fat which the cream contains, it must be separated from the accompanying liquid in which it is suspended. To provide for testing cream in connection with a cream separator, it is necessary that the testing bottle be held in axial alinement with the spindle or rotary separating bowl of the separator in order to obtain the necessary centrifugal action. To utilize the rotary movement of the separating bowl for this purpose, the bottle-holder herein described is placed on the upper end of the cap of said bowl by springing the jaws 15 over the flange 12 of said cap, the tension of said jaws being sufficient to securely retain the holder in place and cause it to rotate with the bowl. The bottle 13 with the requisite amount of cream therein properly treated for testing is then placed between the spring retaining fingers 17 of the holder, as shown in Fig. 1, and the separating machine operated through the medium of the crank 3 in a proper manner to afford the required centrifugal action to effect a separation of the butter fat from its accompanying liquid, so that upon the addition of a proper amount of water to the bottle the butter fat will be caused to stand in the graduated neck thereof so as to indicate on the scale the quantity of butter fat contained in the cream, as will be well understood in the art.

This device is very simple and inexpensive and may be readily attached to the separator bowl without removing any part thereof, whereby the operation of testing the cream may be quickly and easily accomplished. When the testing operation shall have been completed, the bottle-holder may be removed by disengaging the spring jaws from the flange of the top or cap of the separator bowl.

Having thus fully set forth my invention, what I claim as new and desire to secure by Letters Patent, is:—

1. In a cream tester the combination with a rotary member, of a bottle-holder having jaws to engage said member and retain said holder concentric thereof, said bottle-holder having bottle-engaging means disposed to retain the bottle axially in alinement with said rotary member.

2. In a cream tester, the combination with a rotary member, of a bottle-holder having jaws to engage said member and retain the holder concentric thereof, said holder having a bottle retainer comprising resilient members disposed to embrace a testing bottle and hold it in axial alinement with said rotary member.

3. The combination with a rotary member of a separator, a bottle-holder having jaws adapted to engage said rotary member to position said holder centrally thereof, said holder having spring members disposed concentrically of the axis of rotation of said rotary member, and a testing bottle seated in said spring members.

4. The combination with the rotary bowl of a separator, of a top on said bowl, a bottle-holder seated on said top and positioned concentric of the axis of rotation thereof, said bottle-holder having opposed spring members, and a testing bottle confined within said members and centered with respect to the axis of the bowl.

5. The combination with a separator bowl, of a bottle-holder having spring jaws adapted to engage the top of said bowl and center said holder with respect thereto, said bottle-holder having means for yieldingly retaining a bottle therein centrally thereof.

6. In a cream tester, a bottle-holder having jaws adapted to engage a rotary member and attach the holder thereto centrally thereof, said holder having upwardly extending spring members adapted to engage and confine a bottle centrally of the axis of said rotary member.

In testimony whereof, I sign this specification in the presence of two witnesses.

MERLE G. CAMPAU.

Witnesses:
 WALTER D. EASTMAN,
 JAMES KLEIBER.

---

Copies of this patent may be obtained for five cents each, by addressing the "Commissioner of Patents, Washington, D. C."